(12) United States Patent
Kang et al.

(10) Patent No.: US 8,734,029 B2
(45) Date of Patent: May 27, 2014

(54) ZOOM LENS BARREL ASSEMBLY AND PHOTOGRAPHING APPARATUS INCLUDING THE SAME

(71) Applicant: Samsung Electronics Co., Ltd., Suwon-si (KR)

(72) Inventors: Yoon-seok Kang, Seoul (KR); Ki-yun Jo, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/709,357

(22) Filed: Dec. 10, 2012

(65) Prior Publication Data

US 2013/0322865 A1    Dec. 5, 2013

(30) Foreign Application Priority Data

Jun. 5, 2012    (KR) .......................... 10-2012-0060527

(51) Int. Cl.
*G03B 17/04*    (2006.01)

(52) U.S. Cl.
USPC .......................................... 396/349; 396/448

(58) Field of Classification Search
USPC .................................................. 396/349, 448
See application file for complete search history.

(56) References Cited

U.S. PATENT DOCUMENTS

| | | | | |
|---|---|---|---|---|
| 4,843,411 | A * | 6/1989 | Wakabayashi et al. | 396/349 |
| 5,136,315 | A * | 8/1992 | Nomura | 396/349 |
| 5,598,241 | A * | 1/1997 | Nomura et al. | 396/79 |
| 6,456,791 | B1 * | 9/2002 | Nishimura et al. | 396/72 |
| 2006/0165406 | A1 * | 7/2006 | Makii | 396/349 |
| 2007/0133981 | A1 * | 6/2007 | Tsuji | 396/448 |
| 2010/0209088 | A1 * | 8/2010 | Masuki | 396/55 |

* cited by examiner

*Primary Examiner* — WB Perkey
(74) *Attorney, Agent, or Firm* — Drinker Biddle & Reath LLP

(57) ABSTRACT

A zoom lens barrel assembly includes: a first barrel including an inlet through which light is incident on the first barrel; a second barrel that surrounds at least a part of an external surface of the first barrel and supports the first barrel to be movable to protrude forward from a front portion of a main body; a plurality of blades disposed to be moved between an open position in which the plurality of blades are retreated to an outside of the inlet and a closed position in which the inlet is blocked; and an accommodation unit that extends from an end of the first barrel to an outside of the first barrel so as to accommodate the blades that have been moved to the open position.

19 Claims, 7 Drawing Sheets

ZOOM LENS BARREL ASSEMBLY AND PHOTOGRAPHING APPARATUS INCLUDING THE SAME

CROSS-REFERENCE TO RELATED PATENT APPLICATION

This application claims the priority benefit of Korean Patent Application No. 10-2012-0060527, filed on Jun. 5, 2012, in the Korean Intellectual Property Office, the disclosure of which is incorporated herein in its entirety by reference.

BACKGROUND

1. Field

Embodiments relate to a zoom lens barrel assembly and a photographing apparatus including the same, and more particularly, to a zoom lens barrel assembly having a compact structure in which an accommodation unit for accommodating blades is disposed and a photographing apparatus including the zoom lens barrel assembly.

2. Description of the Related Art

A zoom lens barrel assembly is mounted on photographing apparatuses, such as digital still cameras (DSCs), digital video cameras, and the like, which capture an image of a subject. The zoom lens barrel assembly is classified as an interchangeable zoom lens barrel assembly in which a camera body and an interchangeable lens can be separated from each other, and a fixed zoom lens barrel assembly in which a lens is fixed on a camera body, depending on the structure of the zoom lens barrel assembly.

While an image-capturing operation is performed, ends of the zoom lens barrel assembly are opened so that light emitted from the subject is incident on the zoom lens barrel assembly. After the image-capturing operation has been performed, the ends of the zoom lens barrel assembly are closed so as to protect a lens and to prevent external foreign substances from flowing into the zoom lens barrel assembly.

U.S. Pat. No. 8,182,160, issued on May 22, 2012, discloses a lens barrier apparatus that is installed on a front end of a zoom lens barrel assembly to protect a lens. According to the disclosure of the lens barrier apparatus, as the size of the zoom lens barrel assembly is decreased, a space of the zoom lens barrel assembly in which a lens barrier is accommodated is insufficient so that the number of blades of the lens barrier needs to be increased. When the number of blades of the lens barrier is increased, the blades of the lens barrier have to overlap with one another so as to be accommodated in the zoom lens barrel assembly and thus the length of the zoom lens barrel assembly needs to be increased.

SUMMARY

Embodiments include a zoom lens barrel assembly having a compact structure and a photographing apparatus including the zoom lens barrel assembly.

Embodiments also include a zoom lens barrel assembly in which the number of blades operating to protect a lens may be minimized, and a photographing apparatus including the zoom lens barrel assembly.

Embodiments also include a zoom lens barrel assembly in which an accommodation space for blades protecting a lens may be guaranteed, and a photographing apparatus including the zoom lens barrel assembly.

According to an embodiment, a zoom lens barrel assembly includes: a first barrel including an inlet through which light is incident on the first barrel; a second barrel that surrounds at least a part of an external surface of the first barrel and supports the first barrel to be movable to protrude forward; a plurality of blades disposed to be moved between an open position in which the plurality of blades are retreated to an outside of the inlet and a closed position in which the inlet is blocked; and an accommodation unit that extends outwards from an end of the first barrel so as to accommodate the blades that have been moved to the open position.

The zoom lens barrel assembly may further include a driving plate that rotates the blades between the open position and the closed position.

The driving plate may be rotatably disposed on the accommodation unit, may be rotated by a driving force transferred from outside, and may rotate the blades.

The zoom lens barrel assembly may further include a driving unit that generates a driving force for rotating the driving plate.

While the accommodation unit and the first barrel are rotated, the driving plate may be maintained fixed to the accommodation unit and the first barrel to rotate the blades.

The zoom lens barrel assembly may further include a decoration ring including a barrel hole through which light is incident and installed at an end of the accommodation unit.

The zoom lens barrel assembly may further include a third barrel that surrounds an outside of the second barrel and supports the second barrel to be movable to protrude forward.

The zoom lens barrel assembly may further include an elastic support unit that is connected to the blades and the accommodation unit and elastically supports the blades with respect to the accommodation unit.

The accommodation unit may protrude outward from the first barrel so as to correspond to a thickness of the second barrel.

The accommodation unit may cover an end of the second barrel in a state where the first barrel is accommodated in the second barrel.

According to another embodiment, a photographing apparatus includes: a main body; and a first barrel including an inlet through which light is incident on the first barrel that is disposed to be movable with respect to the main body so as to protrude forward from the main body; a plurality of blades disposed to be moved between an open position in which the plurality of blades are retreated to an outside of the inlet and a closed position in which the inlet is blocked; and an accommodation unit that extends outwards from an end of the first barrel so as to accommodate the blades that have been moved to the open position.

The photographing apparatus may further include a second barrel that surrounds an outside of the first barrel and is disposed to be movable with respect to the main body so as to protrude from the main body.

BRIEF DESCRIPTION OF THE DRAWINGS

The above and other features and advantages will become more apparent by describing in detail exemplary embodiments with reference to the attached drawings in which.

DETAILED DESCRIPTION

Hereinafter, exemplary embodiments will be described in detail with reference to the attached drawings.

Figure 1:
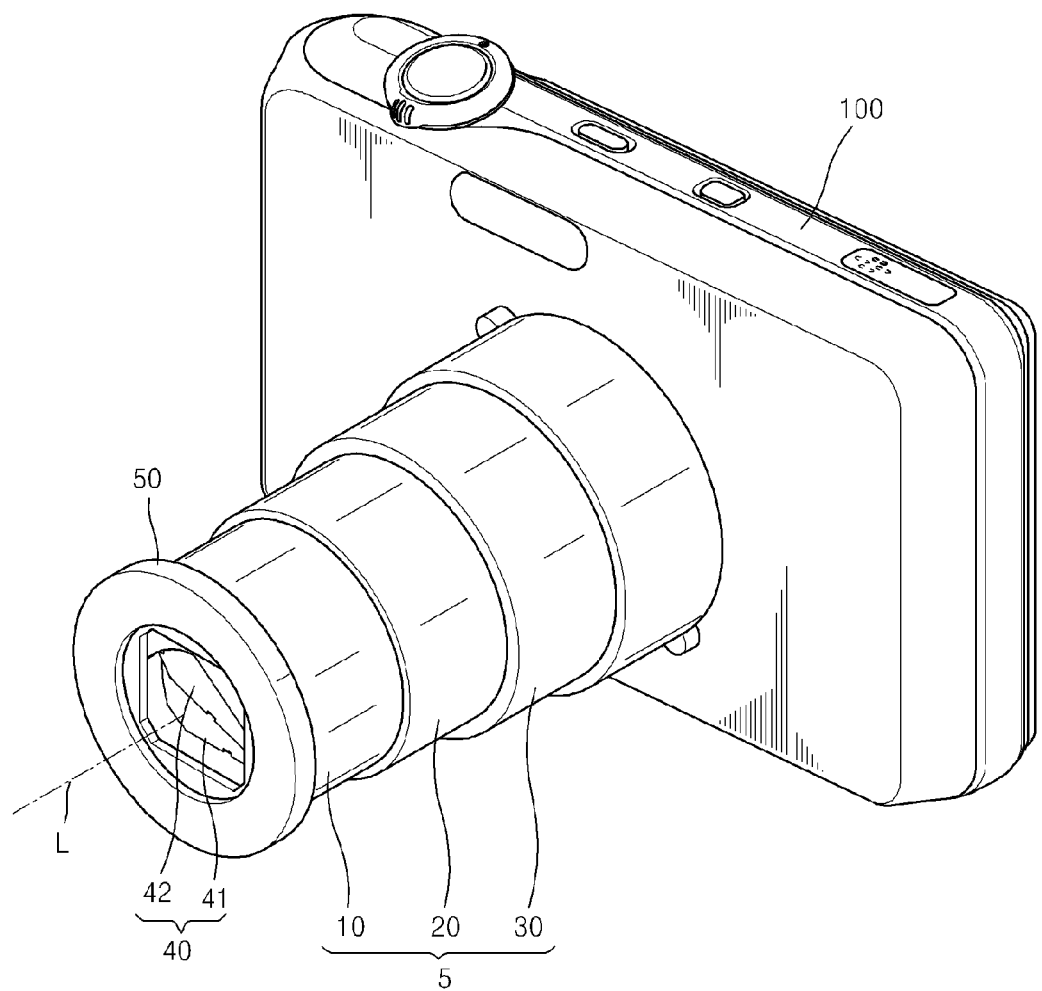
FIG. 1 is a perspective view of a photographing apparatus including a zoom lens barrel assembly, according to an embodiment.
Figure 2:
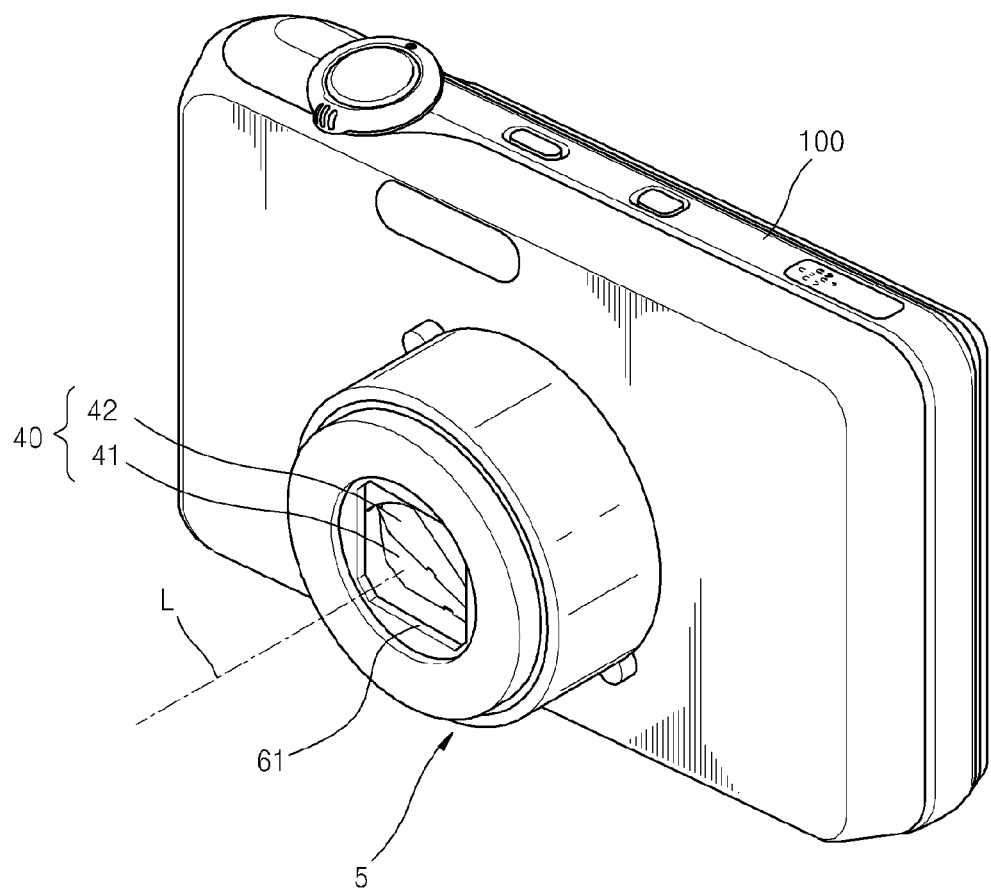
FIG. 2 is a perspective view illustrating a state where the zoom lens barrel assembly illustrated in FIG. 1 is accommodated in the photographing apparatus of FIG. 1, according to an embodiment.

FIG. 1 is a perspective view of a photographing apparatus including a zoom lens barrel assembly 5, according to an embodiment, and FIG. 2 is a perspective view illustrating a state where the zoom lens barrel assembly 5 illustrated in FIG. 1 is accommodated in the photographing apparatus of FIG. 1, according to an embodiment.

The zoom lens barrel assembly 5 illustrated in FIGS. 1 and 2 includes a first barrel 10 and a second barrel 20 that supports the first barrel 10 so as to be movable. The zoom lens barrel assembly 5 of FIGS. 1 and 2 is combined with a main body 100 of the photographing apparatus and may be moved between a position in which the zoom lens barrel assembly 5 protrudes from a front portion of the main body 100, as illustrated in FIG. 1, and a position in which the zoom lens barrel assembly 5 is accommodated in the main body 100 of the photographing apparatus, as illustrated in FIG. 2.

The photographing apparatus including the zoom lens barrel assembly 5 having the above structure may be modified into a digital still camera (DSC) that captures a still image, a digital camcorder that captures a moving picture image, a camera module that is installed at a portable mobile device, or the like, for example.

Although not shown, the photographing apparatus may include an image capturing element (not shown) that converts image light irradiated from the zoom lens barrel assembly 5 into an electrical signal. The image capturing element may be a photoelectric transformation element, such as a charge-coupled device (CCD), or a complementary metal oxide semiconductor (CMOS).

The zoom lens barrel assembly 5 introduces light emitted from a subject to the image capturing element and forms an image of the subject on the surface of the image capturing element. Each of the first barrel 10, the second barrel 20, and a third barrel 30 of the zoom lens barrel assembly 5 includes an optical lens (not shown).

In the present embodiment, the number of barrels of the zoom lens barrel assembly 5 is three. However, this should not be construed as limiting, as the number of barrels of the zoom lens barrel assembly 5 may be two or four or more depending on optical design specifications.

The zoom lens barrel assembly 5 protrudes from the main body 100 of the photographing apparatus and extends to the outside, as illustrated in FIG. 1. Thus, optical lenses of the zoom lens barrel assembly 5 are moved along a direction L of an optical axis, and the zoom lens barrel assembly 5 performs a zooming operation of adjusting magnification of the image of the subject and a focusing operation of adjusting a focus of the subject.

The photographing apparatus illustrated in FIGS. 1 and 2 is a barrel-fixed photographing apparatus in which the zoom lens barrel assembly 5 is fixedly mounted on the main body 100 of the photographing apparatus. However, this should not be construed as limiting. Thus, the zoom lens barrel assembly 5 may be a barrel-interchangeable photographing apparatus that is separated from or mounted on the main body 100 of the photographing apparatus barrel.

When the photographing apparatus does not perform an image-capturing operation, the zoom lens barrel assembly 5 is accommodated in the main body 100 of the photographing apparatus, as illustrated in FIG. 2. A lens barrier 40, including a plurality of blades 41 and 42, is installed in front of the zoom lens barrel assembly 5. The lens barrier 40 blocks a barrel hole 61 through which light is incident, in the state where the zoom lens barrel assembly 5 is accommodated in the main body 100 of the photographing apparatus, so as to protect a lens of the zoom lens barrel assembly 5.

When the photographing apparatus performs the image-capturing operation, the zoom lens barrel assembly 5 protrudes forward from the main body 100 of the photographing apparatus along the direction L of the optical axis, as illustrated in FIG. 1. When the zoom lens barrel assembly 5 protrudes from the main body 100 of the photographing apparatus, the blades 41 and 42 of the lens barrier 40 are moved to an outside of the barrel hole 61 so that the barrel hole 61 may be opened and light may transmit through the barrel hole 61.

Figure 3:
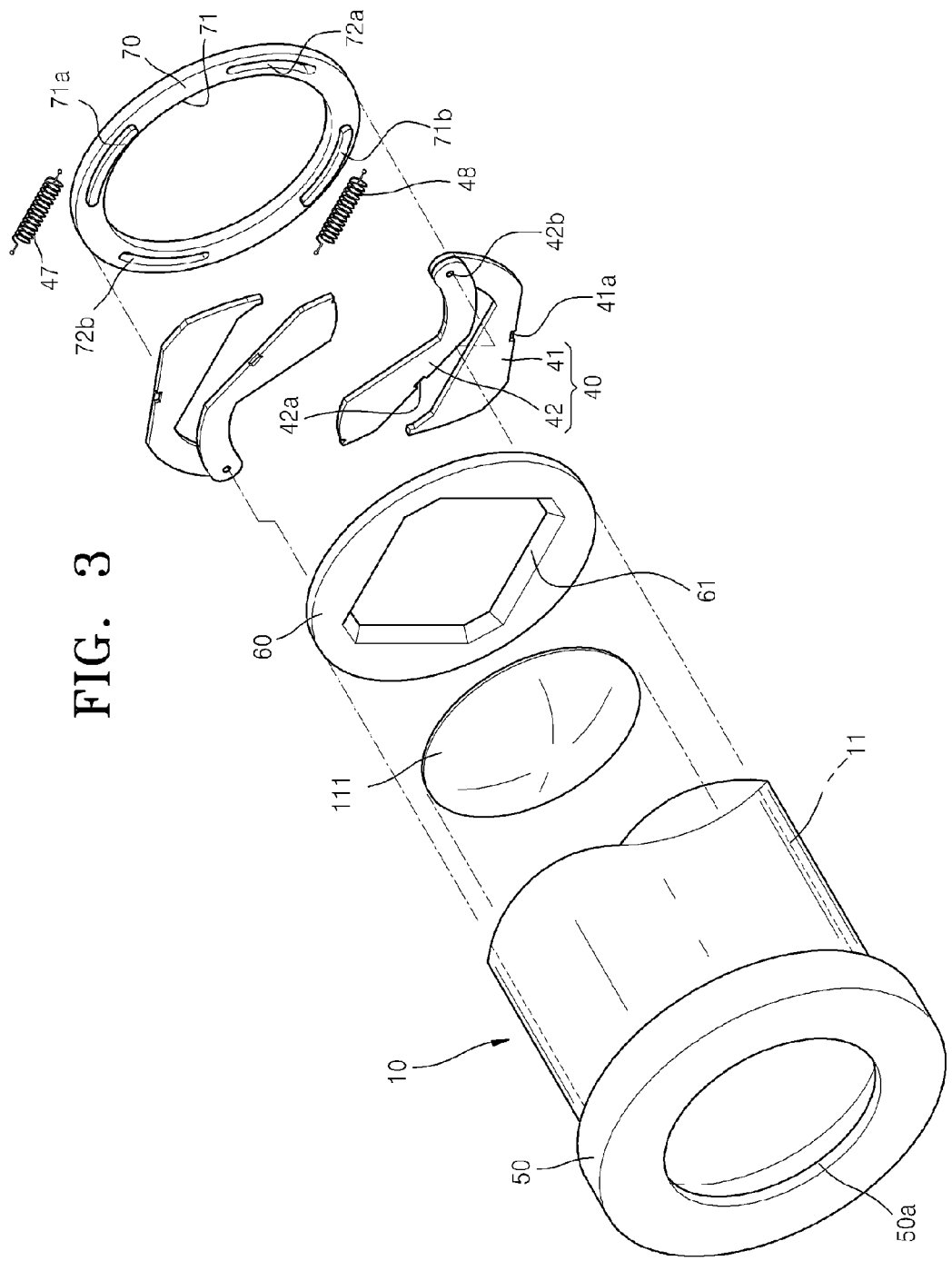
FIG. 3 is a schematic exploded perspective view showing the combination relationship between some elements of the zoom lens barrel assembly of FIG. 1, according to an embodiment.
Figure 4:
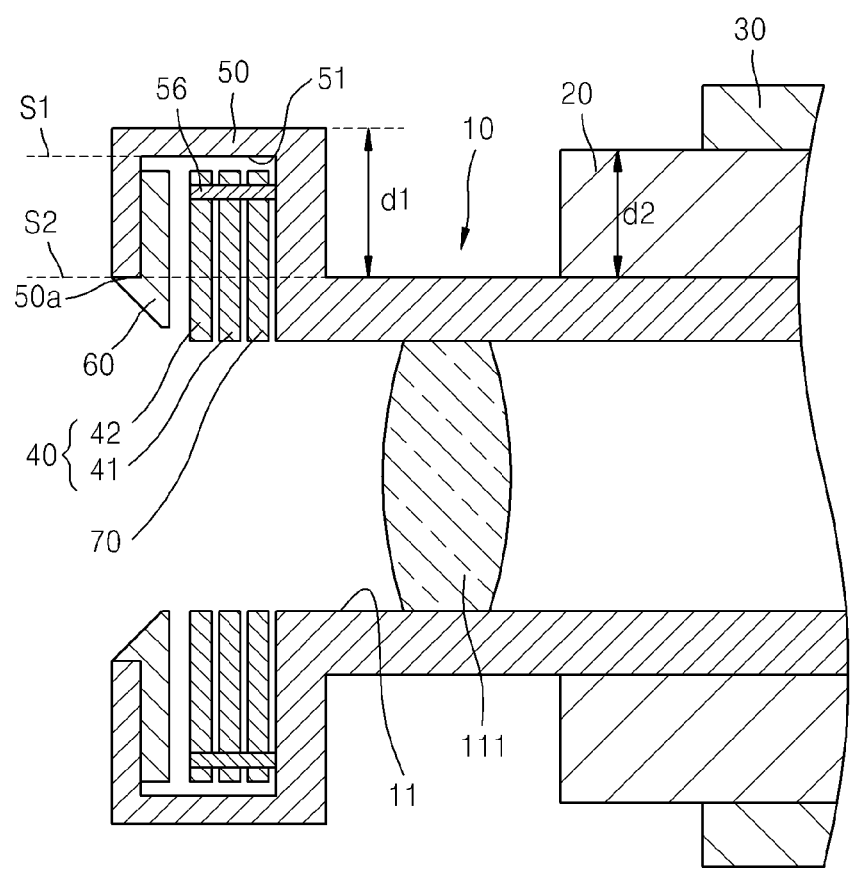
FIG. 4 is a cross-sectional view of a part of the zoom lens barrel assembly of FIG. 1, according to an embodiment.

FIG. 3 is a schematic exploded perspective view showing the combination relationship between some elements of the zoom lens barrel assembly 5 of FIG. 1, according to an embodiment, and FIG. 4 is a cross-sectional view of a part of the zoom lens barrel assembly 5 of FIG. 1, according to an embodiment.

FIGS. 3 and 4 illustrate elements to be mounted in the first barrel 10 of the zoom lens barrel assembly 5. The zoom lens barrel assembly 5 includes the first barrel 10 including an inlet 11 through which light is incident, the blades 41 and 42 that are disposed to be moved between an open position in which the plurality of blades 41 and 42 are retreated toward an outside of the inlet 11 and a closed position in which the inlet 11 is blocked, and an accommodation unit 50 that accommodates the blades 41 and 42 extending from an end of the first barrel 10 to an outside of the first barrel 10.

The first barrel 10 is configured of a cylindrical-shaped hollow that includes the inlet 11 through which light is incident. A lens 111 is installed at the inlet 11 of the first barrel 10. The first barrel 10 may be inserted into the second barrel 20 illustrated in FIG. 2 or may protrude from the second barrel 20 forward.

The accommodation unit 50 is formed at a front end of the first barrel 10, protrudes from an external edge of the first barrel 10 to an outside of the first barrel 10 in a radial direction, and extends to the outside of the first barrel 10. The accommodation unit 50 may be configured as a one body with the first barrel 10 when the first barrel 10 is manufactured.

The way to manufacture the accommodation unit 50 is not limited thereto, and the first barrel 10 and the accommodation unit 50 may be combined with each other after the first barrel 10 and the accommodation unit 50 are independently manufactured. When the first barrel 10 and the accommodation unit 50 are independently manufactured, for example, the first barrel 10 and the accommodation unit 50 may be bonded to each other by using an adhesive, or a combination structure, such as a screw, may be inserted between the first barrel 10 and the accommodation unit 50.

The accommodation unit 50 extends from the first end of the first barrel 10 along a circumferential direction of the first barrel 10 and constitutes an accommodation space 51. The plurality of blades 41 and 42 that are moved to the open position may be accommodated in the accommodation space 51 of the accommodation unit 50.

A rotation center portion 42b that is disposed on an end of each of the plurality of blades 41 and 42 is rotatably combined with the accommodation unit 50 via a support pin 56. Thus, the blades 41 and 42 may be moved between the open position in which the plurality of blades 41 and 42 are retreated toward an outside of the inlet 11 and the closed position in which the inlet 11 is blocked.

Referring to FIG. 4, since an end position S1 of the accommodation space 51 of the accommodation unit 50 is an outer position than an external surface position S2 of the first barrel 10, a sufficient space in which the lens barrier 40 including the blades 41 and 42 may be accommodated may be guaranteed.

A driving plate 70 having a ring shape is rotatably disposed in the accommodation unit 50. The driving plate 70 having a ring shape includes a barrel hole 71 through which light is incident and long holes 72a and 72b through which the support pin 56 passes. In addition, the driving plate 70 includes contact stoppers 71a and 71b that contact the lens barrier 40 while being rotated and that enable the lens barrier 40 to be rotated.

Although a driving unit that generates a driving force for rotating the driving plate 70, is not shown, the driving unit (not shown) may be implemented using an ultrasonic motor, a step motor, or the like, for example, and may transfer the driving force generated by the driving unit (not shown) to the driving plate 70 so as to rotate the driving plate 70.

As described above, the driving plate 70 is rotated in the first barrel 10 and the accommodation unit; however, the present embodiment is not limited to an installation structure of the driving plate 70. For example, while the first barrel 10 and the accommodation unit 50 are rotated, the driving plate 70 may be maintained fixed to the first barrel 10 and the accommodation unit 50 so that the driving plate 70 may rotate the blades 41 and 42.

Elastic support units 47 and 48 may be connected to the blades 41 and/or 42 of the lens barrier 40 and the accommodation unit 50 and elastically support the blades 41 and/or 42 with respect to the accommodation unit 50. The elastic support units 47 and 48 may comprise springs.

The blades 41 and/or 42 may include notches 41a and 42a, respectively. The notches 41a and 42a may be on a side of the blades 41 and/or 42 that is closest to an interior side of the accommodation unit in the accommodation space 51.

An opening 50a is formed in a front end of the accommodation unit 50, and a decoration ring 60 is installed at the opening 50a and includes a barrel hole 61 through which light is incident. The decoration ring 60 is exposed from an end of the zoom lens barrel assembly 5 to the outside. As the lens barrier 40 operates, the barrel hole 61 of the decoration ring 60 may be opened or closed.

A thickness d1 of the accommodation unit 50 that protrudes from the external edge of the first barrel 10 may correspond to a protruding thickness d2 of the second barrel 20. Thus, the zoom lens barrel assembly 5 may be moved to an accommodation position, and the first barrel 10 may be inserted into the second barrel 20, and the accommodation unit 50 may cover the front end of the second barrel 20.

Figure 5:
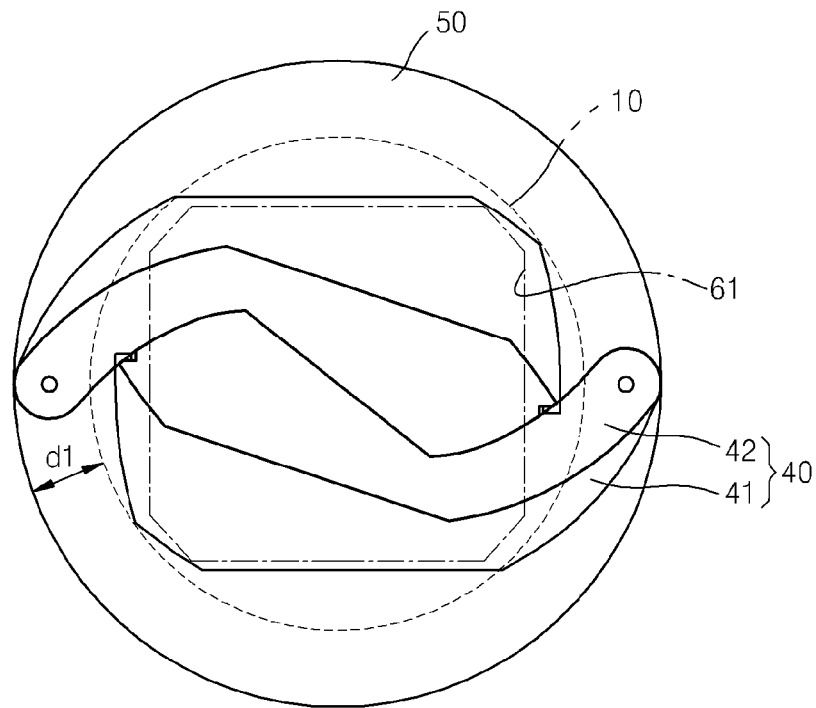
FIG. 5 is a front view of a part of the zoom lens barrel assembly of FIG. 1, according to an embodiment.
Figure 6:
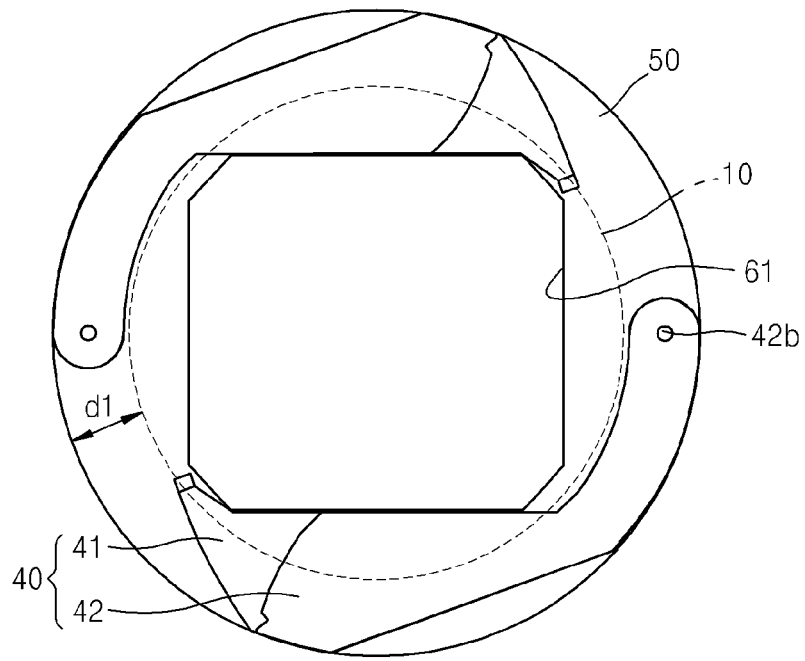
FIG. 6 is a front view illustrating a state where blades of the zoom lens barrel assembly of FIG. 1 are opened, according to an embodiment.

FIG. 5 is a front view of a part of the zoom lens barrel assembly 5 of FIG. 1, according to an embodiment, and FIG. 6 is a front view illustrating a state where the blades 41 and 42 of the zoom lens barrel assembly 5 of FIG. 1 are opened, according to an embodiment.

When the zoom lens barrel assembly 5 is accommodated in the photographing apparatus (see FIG. 1), the blades 41 and 42 of the lens barrier 40 are rotated around the rotation center portion 42b and are moved to a closed position in which the barrel hole 61 is blocked, as illustrated in FIG. 5. In the state where the barrel hole 61 is closed, the lens barrier 40 may prevent external foreign substances from flowing into the zoom lens barrel assembly 5.

When the zoom lens barrel assembly 5 operates, the blades 41 and 42 of the lens barrier 40 are rotated around the rotation center portion 42b in opposite directions and are moved to an open position in which the plurality of blades 41 and 42 are retreated toward an outside of the barrel hole 61, as illustrated in FIG. 6. In the state where the barrel hole 61 is opened, external light may be incident on the zoom lens barrel assembly 5 through the barrel hole 61.

Referring to FIGS. 5 and 6, the accommodation unit 50 protrudes from the end of the first barrel 10 to the outside of the first barrel 10 to a predetermined thickness d1, thereby guaranteeing a space in which the blades 41 and 42 may be accommodated. The predetermined thickness d1 of the accommodation unit 50 extends along a circumferential direction of the first barrel 10 so as to constitute the space in which the blades 41 and 42 may be accommodated. Thus, the number of blades 41 and 42 used in closing the barrel hole 61 through which light is incident on the first barrel 10 may be reduced.

Figure 7:
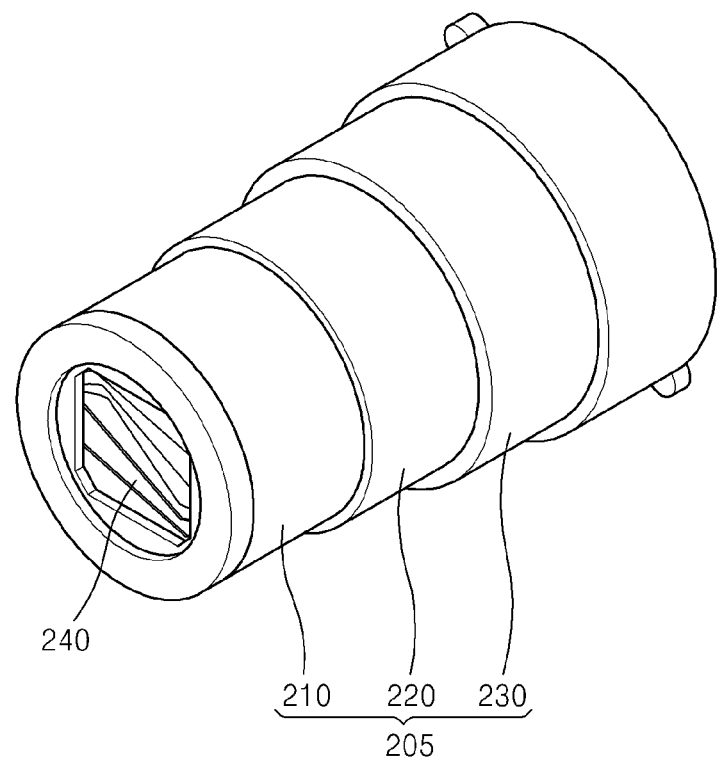
FIG. 7 is a perspective view of a zoom lens barrel assembly according to a comparative example to be compared with the zoom lens barrel assembly of FIG. 1, according to an embodiment.
Figure 8:
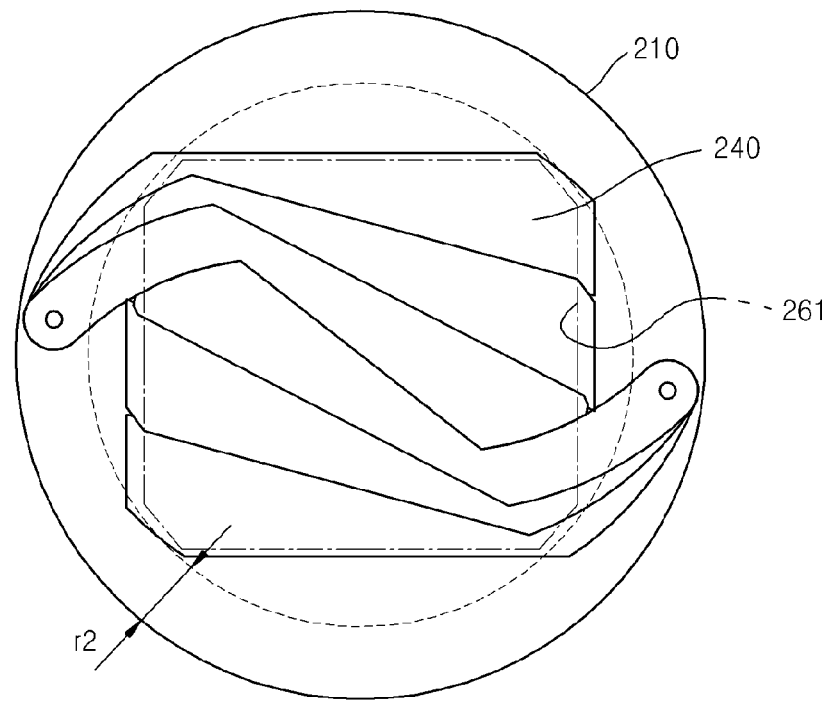
FIG. 8 is a front view of a part of the zoom lens barrel assembly illustrated in FIG. 7, according to an embodiment.
Figure 9:
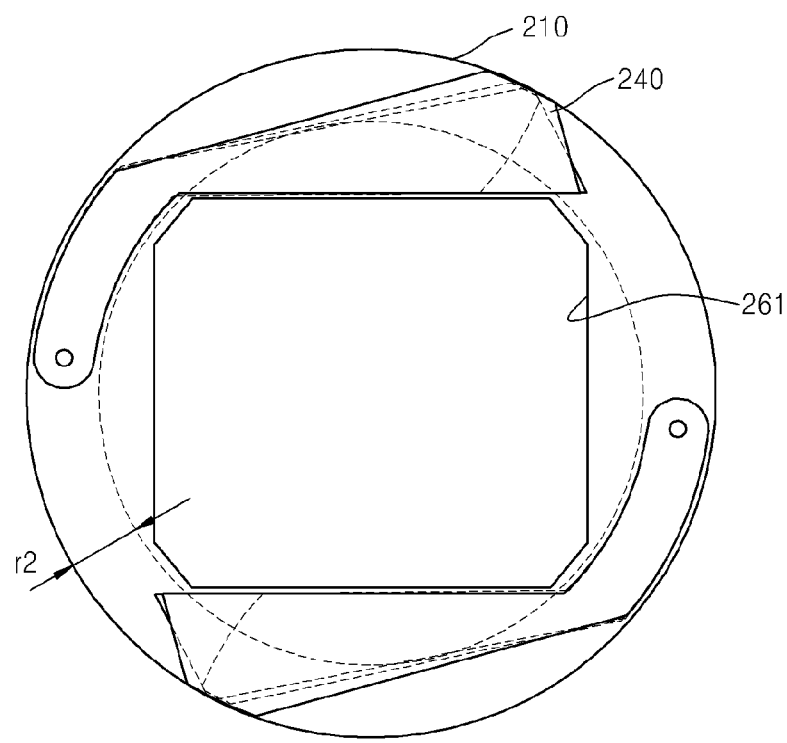
FIG. 9 is a front view illustrating a state where blades of the zoom lens barrel assembly of FIG. 7 are opened, according to an embodiment.

FIG. 7 is a perspective view of a zoom lens barrel assembly 205 according to a comparative example to be compared with the zoom lens barrel assembly 5 of FIG. 1, according to an embodiment, FIG. 8 is a front view of a part of the zoom lens barrel assembly 205 illustrated in FIG. 7, according to an embodiment, and FIG. 9 is a front view illustrating the state where blades of the zoom lens barrel assembly 205 of FIG. 7 are opened, according to an embodiment.

The zoom lens barrel assembly 205 according to the comparative example of FIG. 7 includes a first barrel 210, a second barrel 220, and a third barrel 230. A lens barrier 240 is installed at an end of the first barrel 210. In the zoom lens barrel assembly 205 of FIG. 7, no accommodation unit is installed at the end of the first barrel 210, unlike the zoom lens barrel assembly 5 of FIGS. 1 through 6. That is, the end of the first barrel 210 is not extended to the outside.

Referring to FIGS. 8 and 9, when the zoom lens barrel assembly 205 is designed to have a diameter that is approximately the same as that of the zoom lens barrel assembly 5 of FIGS. 1 through 6, the number of blades of the lens barrier 240 for performing a function of opening or closing a barrel hole 261 may be increased.

By moving the lens barrier 240 to an outside of the barrel hole 261, when the barrel hole 261 is opened, the lens barrier 240 at the end of the first barrel 210 has to be accommodated in an external edge region of the barrel hole 261. Since the thickness of the edge region of the first barrel 210 is r2, a space in which the lens barrier 240 may be accommodated, according to the comparative example is narrower than a space obtained by the protruding thickness d1 of the accommodation unit 50 illustrated in FIGS. 5 and 6.

In FIGS. 5 and 6, four blades 41 and 42 may be used in closing the barrel hole 61. However, in FIGS. 8 and 9, the number of blades of the lens barrier 240 is increased to six. If the number of blades of the lens barrier 240 is increased, the thickness of the zoom lens barrel assembly 205 in a direction of an optical axis has to be increased so that the blades may overlap with one another when the lens barrier 240 is moved to the outside of the barrel hole 61 in order to open the lens barrier 240.

In the zoom lens barrel assembly 5 and the photographing apparatus including the zoom lens barrel assembly 5 illustrated in FIGS. 1 and 6, the lens barrier 40 that may minimize the number of blades 41 and 42 and may open or close the zoom lens barrel assembly 5 may be implemented. Thus, since the thickness of the zoom lens barrel assembly 205 in the direction of the optical axis may be reduced so that a photographing apparatus having a compact structure may be designed, the number of components of the photographing apparatus may be reduced and assembling and design of the photographing apparatus may be easily performed.

As described above, in a zoom lens barrel assembly and a photographing apparatus including the zoom lens barrel assembly according to the one or more embodiments, since an accommodation unit accommodates blades, a lens barrier may be implemented by using a minimum number of blades without increasing a diameter of the zoom lens barrel assembly. Since the number of blades used in the lens barrier may be minimized, the size of a space in which the blades overlap with one another may be reduced so that the thickness of the zoom lens barrel assembly in a direction of an optical axis may be reduced and the number of components of the photographing apparatus may be reduced.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A zoom lens barrel assembly comprising:
   a first barrel comprising an inlet through which light is incident on the first barrel;
   a second barrel that surrounds at least a part of an external surface of the first barrel and supports the first barrel to be movable to protrude forward;
   a plurality of blades disposed to be moved between an open position in which the plurality of blades are retreated to an outside of the inlet and a closed position in which the inlet is blocked; and
   an accommodation unit that extends outwards from an end of the first barrel so as to accommodate the blades that have been moved to the open position,
   wherein an inner circumference of the accommodation unit is greater than an outer circumference of the first barrel.

2. The zoom lens barrel assembly of claim 1, further comprising a driving plate that rotates the blades between the open position and the closed position.

3. The zoom lens barrel assembly of claim 2, wherein the driving plate is rotatably disposed on the accommodation unit, is rotated with respect to the accommodation unit, and rotates the blades.

4. The zoom lens barrel assembly of claim 2, wherein, the accommodation unit and the first barrel are rotatable, the driving plate is disposed to be fixed with respect to the accommodation unit and the first barrel, and while the accommodation unit and the first barrel are rotated, the driving plate is maintained fixed to the accommodation unit and the first barrel to rotate the blades.

5. The zoom lens barrel assembly of claim 1, further comprising a decoration ring comprising a barrel hole through which light is incident and installed at an end of the accommodation unit.

6. The zoom lens barrel assembly of claim 1, further comprising a third barrel that surrounds an outside of the second barrel and supports the second barrel to be movable to protrude forward.

7. The zoom lens barrel assembly of claim 1, further comprising an elastic support unit that is connected to the blades and the accommodation unit and elastically supports the blades with respect to the accommodation unit.

8. A zoom lens barrel assembly comprising:
   a first barrel comprising an inlet through which light is incident on the first barrel;
   a second barrel that surrounds at least a part of an external surface of the first barrel and supports the first barrel to be movable to protrude forward;
   a plurality of blades disposed to be moved between an open position in which the plurality of blades are retreated to an outside of the inlet and a closed position in which the inlet is blocked; and
   an accommodation unit that extends outwards from an end of the first barrel so as to accommodate the blades that have been moved to the open position, wherein the accommodation unit protrudes outward from the first barrel so as to correspond to a thickness of the second barrel.

9. The zoom lens barrel assembly of claim 8, wherein the accommodation unit covers an end of the second barrel in a state where the first barrel is accommodated in the second barrel.

10. A photographing apparatus comprising:
    a main body; and
    a first barrel comprising an inlet through which light is incident on the first barrel that is disposed to be movable with respect to the main body so as to protrude forward from the main body;
    a plurality of blades disposed to be moved between an open position in which the plurality of blades are retreated to an outside of the inlet and a closed position in which the inlet is blocked; and
    an accommodation unit that extends outwards from an end of the first barrel so as to accommodate the blades that have been moved to the open position,
    wherein an inner circumference of the accommodation unit is greater than an outer circumference of the first barrel.

11. The photographing apparatus of claim 10, further comprising a second barrel that surrounds an outside of the first barrel and is disposed to be movable with respect to the main body so as to protrude from the main body.

12. The photographing apparatus of claim 10, further comprising a driving plate that rotates the blades between the open position and the closed position.

13. The photographing apparatus of claim 12, wherein the driving plate is rotatably disposed on the accommodation unit, is rotated with respect to the accommodation unit, and rotates the blades.

14. The photographing apparatus of claim 12, wherein, the accommodation unit and the first barrel are rotatable, the driving plate is disposed to be fixed with respect to the accommodation unit and the first barrel, and while the accommodation unit and the first barrel are rotated, the driving plate is maintained fixed to the accommodation unit and the first barrel and rotates the blades.

15. The photographing apparatus of claim 10, further comprising a decoration ring comprising a barrel hole through which light is incident and installed at an end of the accommodation unit.

16. The photographing apparatus of claim 11, further comprising a third barrel that surrounds an outside of the second barrel, supports the second barrel to be movable to protrude from the main body and is disposed to protrude from the main body.

17. The photographing apparatus of claim 10, further comprising an elastic support unit that is connected to the blades and the accommodation unit and elastically supports the blades with respect to the accommodation unit.

18. A photographing apparatus comprising:
    a main body;
    a first barrel comprising an inlet through which light is incident on the first barrel that is disposed to be movable with respect to the main body so as to protrude forward from the main body;
    a second barrel that surrounds an outside of the first barrel and is disposed to be movable with respect to the main body so as to protrude from the main body;
    a plurality of blades disposed to be moved between an open position in which the plurality of blades are retreated to an outside of the inlet and a closed position in which the inlet is blocked; and an accommodation unit that extends outwards from an end of the first barrel so as to accommodate the blades that have been moved to the open position, wherein the accommodation unit protrudes outward the first barrel so as to correspond to a thickness of the second barrel.

19. The photographing apparatus of claim 18, wherein the accommodation unit covers an end of the second barrel in a state where the first barrel is accommodated in the second barrel.

\* \* \* \* \*